March 7, 1939.  C. SAURER  2,149,902
METHOD OF MAKING VIBRATION INSULATORS
Original Filed April 4, 1931   2 Sheets-Sheet 1
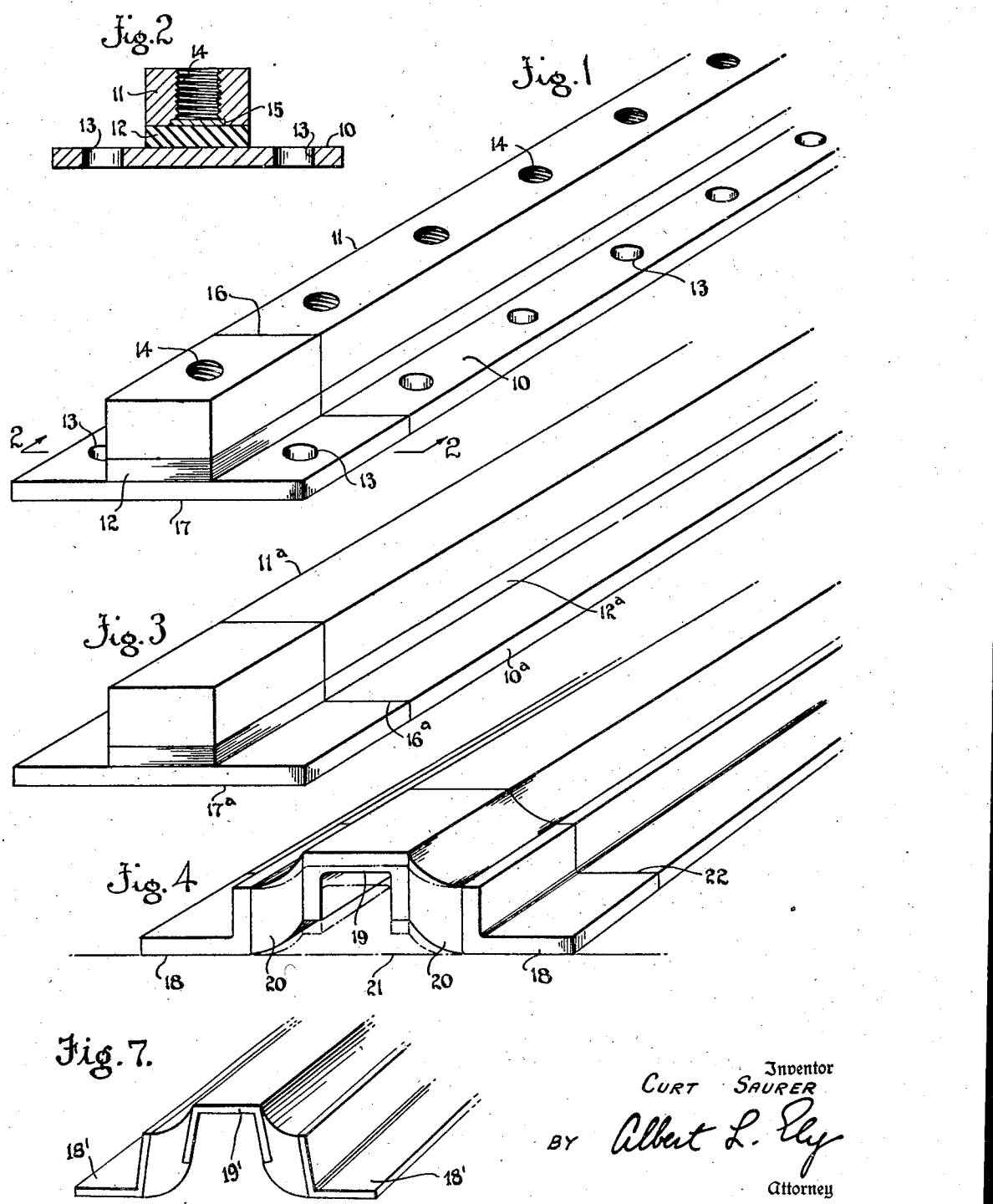
Inventor
CURT SAURER
BY Albert L. Ely
Attorney March 7, 1939.  C. SAURER  2,149,902

METHOD OF MAKING VIBRATION INSULATORS

Original Filed April 4, 1931  2 Sheets-Sheet 2

Inventor
Curt Saurer
By Albert L. Ely
Attorney

Patented Mar. 7, 1939

2,149,902

UNITED STATES PATENT OFFICE

2,149,902

METHOD OF MAKING VIBRATION INSULATORS

Curt Saurer, Akron, Ohio, assignor to The Firestone Tire & Rubber Company, Akron, Ohio, a corporation of Ohio Original application April 4, 1931, Serial No. 527,756, now Patent No. 2,047,493, dated July 14, 1936. Divided and this application June 9, 1936, Serial No. 84,318

2 Claims. (Cl. 29—148)

This invention relates to methods of making vibration insulators, and more especially it relates to the manufacture of vibration insulators comprising rubber, which insulators may be used as resilient supports or for other types of yielding or flexible connections.

The chief objects of the invention are to effect economy in the manufacture of vibration insulators; to provide for the economical and facile production of various vibration insulators of the same structure but of different lengths and drilling; and to provide an improved method of manufacturing vibration insulators.

Of the accompanying drawings:

Figure 1 is a perspective view of a vibration insulator made according to the invention.

Figure 2 is a section on the line 2—2 of Figure 1.

Figure 3 is a modified form of the embodiment shown in Figure 1.

Figure 5:
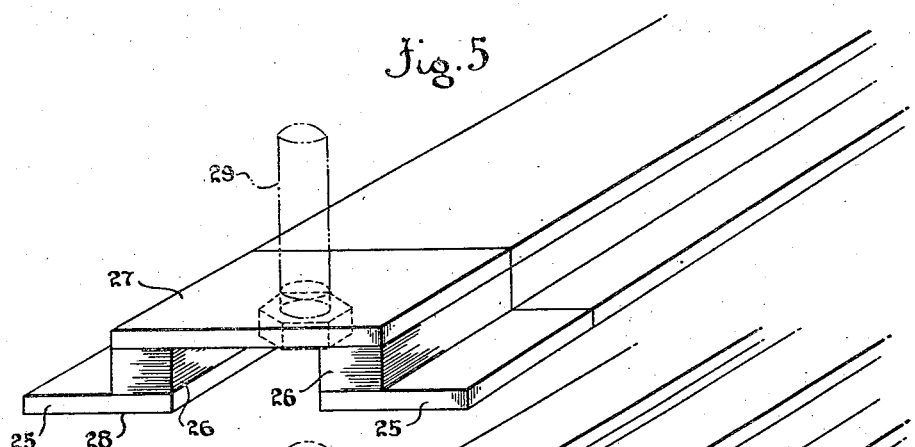

Figures 4, 5, 6, 7, and 8 are other embodiments of the invention.

This application is a division of my prior Patent No. 2,047,493, issued July 14, 1936.

As is shown in the drawings, the respective structures involving the invention are of indefinite length. In practice, the respective insulators are made in conveniently long lengths, sufficient to provide a plurality of individual insulators, and are so furnished to the customer who severs them transversely into individual insulators of the length desired. The insulators may or may not be provided with apertures for the reception of attaching means such as bolts since in some cases these are made by the customer to fit a particular installation. However, the invention contemplates the feature of insulators having threaded holes formed in the metal parts thereof before assembly with the rubber portion of the structure, and provision is made for preventing the entry of rubber into the threaded holes.

Referring to Figures 1 and 2 of the drawings, 10 is a metal base strip, 11 is a metal strip of the same length but narrower width than the base strip 10 superposed on the latter centrally thereof, and 12 is a cushion of resilient rubber positioned between the strips 10, 11 and bonded to each of them, preferably by vulcanization. The base strip 10 may be formed with a longitudinal series of apertures 13, 13 laterally of the strips 11, 12 at each side thereof, but preferably these apertures are formed therein after the strip is subsequently severed into individual units.

The strip 11 is formed with a longitudinal series of threaded holes 14, 14 having axes parallel to the axes of the apertures 13. On the inner face of the strip 11, which face is vulcanized to the rubber cushion 12, the holes 14 are countersunk, and respective metal disks 15 (Figure 2) are fitted into each of said countersinks to prevent the rubber of the cushion 12 from flowing into the holes 14. The composite strip subsequently is transversely severed as at 16 to provide a plurality of individual insulators 17.

The form of insulator shown in Figure 3 comprises a base strip 10ª, superposed strip 11ª, and intermediate rubber cushion 12ª bonded to said strips, all of which parts are identical with corresponding parts of the structure shown in Figures 1 and 2 except that the apertures and threaded holes are omitted. The assembled strip subsequently is transversely severed, by the customer, at 16ª to provide a plurality of individual strips such as the strip 17ª. The strips 17ª subsequently are suitably drilled by the customer to fit the particular installation in which they are employed. The structure shown in Figure 3 may be severed into individual strips 17ª of any suitable length, and thus has a certain advantage over the structure shown in Figure 1 wherein the severing bears a determinate relation to the drilling.

The structure shown in Figure 4 comprises parallel, spaced-apart, angular lateral strips 18, 18, a channel strip 19 positioned between the strips 18 and parallel thereto, the base of the channel preferably being uppermost and the entire strip being somewhat elevated with relation to the strips 18, and cushions of resilient rubber 20, 20 vulcanized to the respective lateral faces of the channel and to the adjacent lateral faces of the respective angle strips 19. At least the bottom face of each cushion 20 is arcuate as shown, the arrangement being such that as the channel 19 is depressed during use the bottom face of each cushion progressively makes contact, as shown in the dotted line position, with the surface 21 of the supporting structure (not shown) upon which the lateral strips 18 are mounted, with the result that the cushions 20 offer progressively increasing resistance to deflection when put under compression by downward movement of the channel 19. The structure is made in indefinite lengths and subsequently is severed as at 22 into individual strips of the desired length.

The structure shown in Figure 5 comprises a pair of parallel, spaced-apart, metal base strips 25, 25, respective cushions of resilient rubber 26, 26 mounted along the adjacent edges of the strips 25 on the upper faces thereof, and a metal top strip 27 overlying the rubber cushions 26 and spanning the space between the strips 25, the surfaces of the rubber cushions being bonded to the adjacent surfaces of said strips. As in the other embodiments of the invention, the structure is of indefinite length and is severed into individual units 28 by the customer. The customer also drills the units as desired, the bridge-like construction of the insulator facilitating the mounting of bolts, such as the bolt 29 indicated in broken lines, through the top strip 27.

Figure 6:
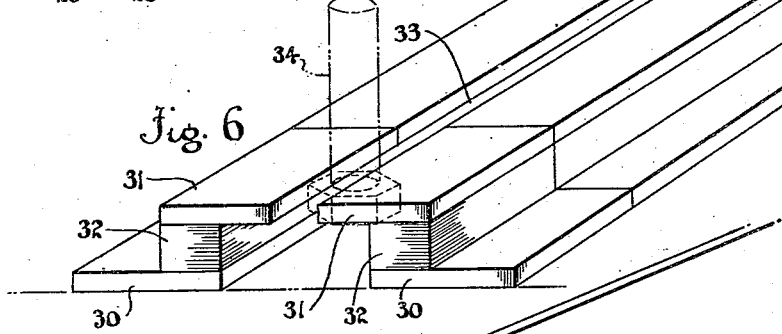

In Figure 6 is shown a vibration insulator comprising a pair of duplicate rubber and metal assemblies each consisting of a metal base strip 30, a parallel, metal top strip 31 extending longitudinally thereof and partially in overlapping relation therewith, and a resilient rubber cushion strip 32 mounted between the overlapping portions of strips 30 and 31, leaving free margins of the metal strips extending laterally on opposite sides of the cushion strip. As in all other embodiments of the invention, the adjacent surfaces of the metal and the rubber cushion strips are vulcanized or bonded together and the structure is of indefinite length to permit severing into individual units of shorter length, and to permit drilling as desired. A pair of units are assembled in juxtaposition as shown in Figure 6, leaving a space 33 therebetween to receive bolts such as the bolt 34 indicated in broken lines, the heads of the bolts being disposed beneath the top strips 31 as shown.

Figure 7 illustrates a modification of the type of insulator disclosed in Figure 4, the confronting sides of angular strips 18¹, 18¹ and channel strip 19¹ being at a slight angle to a plane perpendicular to the base strips and top strip, respectively, of these members. This angular arrangement provides sufficient draft to permit easy removal of the complete insulator from the vulcanizing mold during manufacture.

Figure 8:
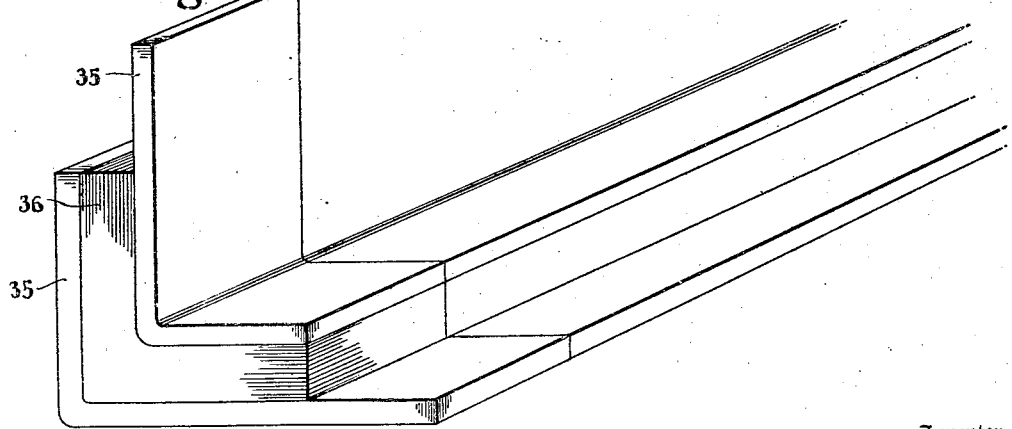

Figure 8 shows a vibration insulator comprising a pair of angle strips 35, 35, each of which has legs of unequal length, said strips being disposed in parallel, spaced-apart relation to each other, the long leg of each strip being positioned beside the short leg of the other strip so as to extend laterally beyond the same. A cushion 36 of resilient rubber is positioned between the strips and vulcanized or bonded to both of them. The insulator is of indefinite length, and is severed into service lengths and drilled by the customer, the drill-holes being disposed in the marginal portion of the long leg of each strip 35.

The several embodiments of the invention described have the common feature of indefinite length which facilitates the manufacture of the strips, and also permits the customer to cut them to proper lengths and to drill them to fit his particular requirement. This results in lower cost of the insulators, and permits various customers to use the same type of insulator without requiring the manufacturer to furnish the same in various lengths and with various sizes and spacing of drilling.

The invention may be further modified within the scope of the appended claims which are not limited wholly to the specific construction shown or described.

What is claimed is:

1. The method of making vibration insulators which comprises forming threaded apertures in a metal strip of indefinite length, inserting a closure member in one end of each of said apertures, assembling said strip with a wider strip of metal and an intervening layer of rubber, the latter adjoining that face of the first mentioned strip which includes the aperture closures, uniting the metal strips by vulcanizing the rubber therebetween, severing the composite structure into individual units of relatively short length, and then drilling the wide strip of the individual units.

2. The method of making vibration insulators which includes the steps of forming an aperture, that is countersunk at one end, in at least one of a pair of metal members, mounting a closure member in said counter sink, assembling said metal members with an intervening layer of unvulcanized rubber composition, the latter adjoining that face of the first mentioned metal member that includes the aperture closure, and then uniting the two metal members by vulcanizing the intervening layer of rubber to them, said rubber preventing displacement of the closure member and the closure member excluding the rubber from the aperture.

CURT SAURER.